Patented May 23, 1939

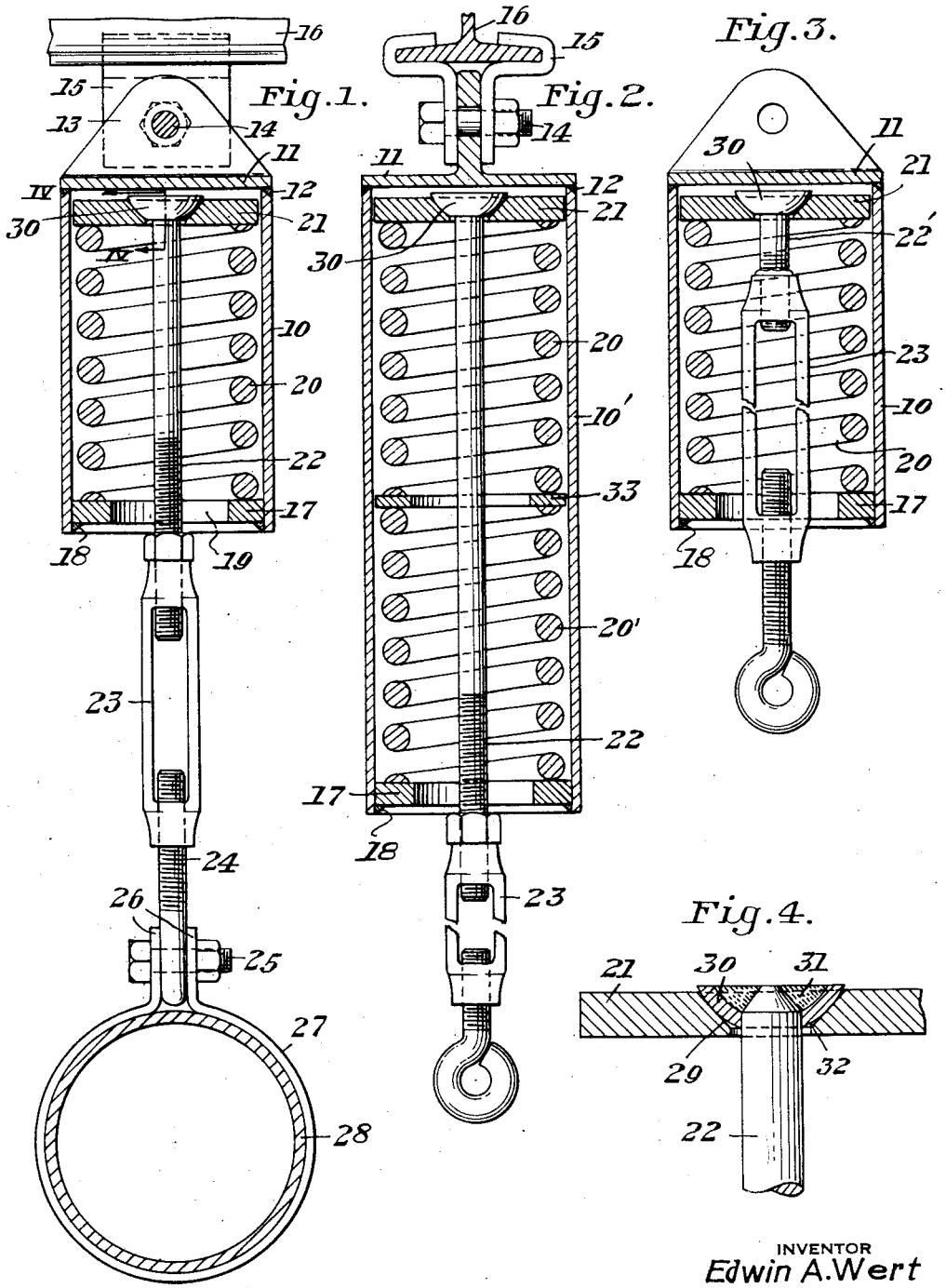

2,159,870

UNITED STATES PATENT OFFICE 2,159,870

HANGER

Edwin A. Wert, Detroit, Mich., assignor to Blaw-Knox Company, a corporation of New Jersey Application March 4, 1938, Serial No. 193,943

5 Claims. (Cl. 248—59)

This invention relates generally to hangers and, in particular, to hangers especially adapted for supporting overhead pipe lines.

The problem of supporting overhead pipe lines is a serious one in many applications and especially so in steam supply lines required in power plants and industrial establishments. Such lines are subject to expansion and contraction resulting from temperature changes and vibration and shock occasioned by their connection to rotating machinery as well as the pulsations in the flow of steam through the line. Because of these conditions, it is desirable to support the pipe in such manner as to permit lateral and longitudinal swinging movement therein within reasonable limits.

Pipe lines are usually supported from the structural frame of the building wherein they are located. Hangers as previously constructed have been characterized by considerable rigidity with little or no freedom for limited pivotal movement relative to the frame members to which they are secured. Because of the number of pipe lines required in certain installations such as power stations, there is not sufficient clearance to permit the hangers to swing bodily to even the limited extent permitted by their construction, and as a result the pipe line is supported rigidly instead of resiliently, as desired.

The present invention overcomes the frequently encountered difficulty mentioned above by providing a pivotal connection within the hanger itself which permits a considerable degree of angular movement between the portion of the hanger secured to a fixed support and that attached to the pipe line to be supported. In a preferred embodiment, the invention comprises a coil spring having a suspension in the form of a casing or frame, and a bearing plate resting on the spring. A hanger rod depending from the bearing plate supports the pipe. The bearing plate and hanger rod have cooperating engaging surfaces which permit relative angular movement therebetween. A more complete understanding of the invention may be obtained from the following detailed description referring to the accompanying drawing illustrating a preferred embodiment and modification thereof. In the drawing:

Figure 1 is a vertical sectional view taken through one form of hanger in accordance with the invention, parts thereof being shown in elevation;

Figure 2 is a similar view showing a modified form of the invention;

Figure 3 is a similar view showing a further modified form of hanger; and

Figure 4 is an enlarged section through the bearing plate and hanger rod, taken substantially along the line IV—IV of Figure 1.

Referring now in detail to the drawing, and particularly, to Fig. 1 for the present, a preferred form of hanger comprises a frame or casing which may conveniently take the form of a short section of pipe indicated at 10 having a closure 11 welded to its upper end as at 12 and provided with a lug 13. The lug 13 is drilled to receive a hanger bolt 14 traversing clamps 15 engaging the flanges of a girder, beam or other fixed frame member 16.

An annular member 17 is secured in the lower end of the tubular casing 10 as by welding at 18 and is provided with a central opening 19. A coil spring 20 disposed coaxially with the casing 10 rests on the member 17. A bearing plate 21 rests on the spring 20. A hanger rod 22 having a turn-buckle 23 incorporated therein depends from the plate 21, through the spring 20 and the opening 19 in the annular member 17. The lower end of the rod 22 is formed into an eye 24 for receiving a bolt 25 traversing lugs 26 on a collar or strap 27 embracing a pipe line 28.

Referring now to Fig. 4, it will be seen that the bearing plate 21 has a frusto-conical seat 29 formed centrally thereof. The seat 29 is adapted to be engaged by a head 30 welded onto the upper end of the hanger rod 22 as at 31. The head 30 has a spherical surface 32 and sufficient clearance is provided between the plate 21 and the rod 22 to permit pivotal movement of the latter relative to the former. It will be apparent that the conformation of the conical surface 29 and the spherical surface 32 permits universal movement of the rod 22 relative to the plate 21. The opening 19 in the annular member 17 is sufficiently large to permit a considerable degree of angular movement of the rod relative to the plate 21 and the remaining parts of the hanger.

It will be readily appreciated that the hanger described above permits the portions of the hanger attached to a fixed support and to the pipe line, respectively, to pivot between extreme positions at considerable angles to each other as contrasted with the relatively rigid hangers previously known. This permits considerable vibration of the pipe line in all directions, even though the casing 10 is rigidly anchored to a support. The coil spring 20 permits the desired amount of vertical movement of the pipe line and the turn buckle 23 facilitates adjustment of the initial stress in the spring.

Figure 2 illustrates a modification of my hanger which differs from that of Figure 1 principally in the use of a spring 20' in addition to that shown at 20. A longer casing 10' is provided to enclose both springs and a separator 33 is disposed between the latter. Otherwise, the hanger of Figure 2 is similar to that of Figure 1, and corresponding parts thereof are indicated by the same reference numerals. The type of hanger shown in Figure 2 provides greater resilience by reason of the increased length of spring contained therein.

Figure 3 illustrates a further modification which is similar to that of Figure 1, except that the hanger rod 22' thereof is quite short so that the turn buckle 23 actually is disposed for the most part in the casing 10. This type of hanger is particularly useful in locations where head room is limited.

Although I have illustrated and described herein but a preferred embodiment of my invention with certain modifications, it will be understood that changes in the construction disclosed may be made without departing from the spirit of the invention or the scope of the appended claims.

I claim:

1. A hanger comprising a coil spring, a hanger rod extending thereinto, a plate bearing on said spring, cooperating means on said plate and rod providing a pivotal mounting for the latter, and means for suspending said spring.

2. A hanger comprising a coil spring, a plate bearing thereon, a rod engaging said plate, cooperating surfaces on said rod and plate permitting pivotal movement thereof, and means for supporting the spring.

3. A hanger comprising a coil spring, a suspension for said spring including an annular member on which the spring rests, a hanger rod extending through said spring and member, and a plate engaging said spring, said rod having a pivotal connection to said plate, said suspension also including means for supporting said annular member.

4. A hanger comprising a coil spring, a supporting frame therefor including a member having an opening therein, said spring resting on said member in alignment with said opening, a hanger rod depending through said spring and opening, and a bearing plate resting on said spring and having a pivotal connection with said rod, said opening being large enough to permit pivotal movement of the rod relative to said plate.

5. A hanger comprising a tubular housing, a suspension for the housing, a disc secured to one end of the housing and having an opening therethrough, a coil spring seated on said disc, a plate resting on said spring, a hanger rod depending through said spring and disc, and cooperating engaging surfaces on said plate and rod permitting relative angular movement therebetween.

EDWIN A. WERT.